United States Patent
Bogdanffy et al.

(10) Patent No.: US 8,602,155 B2
(45) Date of Patent: Dec. 10, 2013

(54) ENGINE ARRANGEMENT COMPRISING A NOISE SHIELD

(75) Inventors: Constantin Bogdanffy, Askim (SE); Per-Uno Sturk, Göteborg (SE); Robert Wickline, High Point, NC (US); Michaell Howell, High Point, NC (US)

(73) Assignee: Volvo Lastvagnar AB, Göteborg (SE)

( * ) Notice: Subject to any disclaimer, the term of this patent is extended or adjusted under 35 U.S.C. 154(b) by 146 days.

(21) Appl. No.: 13/142,870

(22) PCT Filed: Dec. 30, 2008

(86) PCT No.: PCT/SE2008/000753
§ 371 (c)(1),
(2), (4) Date: Sep. 1, 2011

(87) PCT Pub. No.: WO2010/077189
PCT Pub. Date: Jul. 8, 2010

(65) Prior Publication Data
US 2012/0037116 A1  Feb. 16, 2012

(51) Int. Cl.
*F02B 77/13* (2006.01)
*G10K 11/168* (2006.01)
*G10K 11/16* (2006.01)

(52) U.S. Cl.
USPC .................. 181/204; 181/205; 123/195 C

(58) Field of Classification Search
USPC .......... 181/204, 205, 200; 123/198 P, 195 C; 296/39.3, 39.1; 180/69.22
See application file for complete search history.

(56) References Cited

U.S. PATENT DOCUMENTS 3,464,398 A * 9/1969 Thien et al. ............... 123/195 R
3,822,763 A * 7/1974 Adams et al. ................. 181/204

(Continued)

FOREIGN PATENT DOCUMENTS

DE 2817580 A1 11/1978
DE 2952191 A1 6/1981

(Continued)

OTHER PUBLICATIONS

International Search Report for corresponding International Application PCT/SE2008/000753, Sep. 2009.

(Continued)

*Primary Examiner* — Edgardo San Martin
(74) *Attorney, Agent, or Firm* — WRB-IP LLP

(57) ABSTRACT

An engine arrangement for a vehicle, such as a commercial vehicle such as a truck, includes subsequently arranged and encompassed in a casing an engine block, an engine transmission and a flywheel. A noise shield patch is arranged at a circumferential section of the casing corresponding to the location of the flywheel and/or the engine transmission overlaying not more than 75% of the circumferential section. The patch is arranged predominantly beneath the casing.

13 Claims, 7 Drawing Sheets

(56) References Cited

U.S. PATENT DOCUMENTS

| | | | |
|---|---|---|---|
| 3,845,839 A * | 11/1974 | Eriksson | 440/52 |
| 3,882,951 A * | 5/1975 | Conley | 180/294 |
| 4,048,366 A * | 9/1977 | Kingsbury | 428/215 |
| 4,071,008 A * | 1/1978 | Skatsche et al. | 123/198 E |
| 4,114,714 A * | 9/1978 | Fachbach et al. | 180/68.1 |
| 4,141,427 A * | 2/1979 | Kirchweger et al. | 180/69.22 |
| 4,267,805 A * | 5/1981 | Schmuck | 123/198 E |
| 4,420,062 A * | 12/1983 | Fukushima | 181/204 |
| 4,459,944 A * | 7/1984 | Kirchweger et al. | 123/41.66 |
| 5,531,196 A * | 7/1996 | Clark | 123/195 C |
| 5,631,451 A * | 5/1997 | Torisaka et al. | 181/207 |
| 5,681,072 A * | 10/1997 | Stricker | 296/39.3 |
| 5,971,099 A * | 10/1999 | Yasuda et al. | 181/286 |
| 6,581,720 B1 * | 6/2003 | Chen et al. | 181/205 |
| 6,726,273 B2 * | 4/2004 | Kruschhausen et al. | 296/204 |
| 6,769,510 B2 * | 8/2004 | Ueno et al. | 181/204 |
| 6,805,219 B2 * | 10/2004 | Yasuda et al. | 181/204 |
| 7,100,561 B2 * | 9/2006 | Yoo | 123/195 C |
| 7,963,363 B2 * | 6/2011 | Niwa et al. | 181/290 |
| 2006/0151222 A1 * | 7/2006 | Tinti | 180/69.22 |

FOREIGN PATENT DOCUMENTS

| | | | |
|---|---|---|---|
| DE | 3346421 A1 * | 7/1985 | |
| DE | 19534972 A1 | 3/1997 | |
| EP | 0092139 A2 | 10/1983 | |
| EP | 0131856 A1 | 1/1985 | |
| GB | 2018690 A | 10/1979 | |
| JP | 53126624 A * | 11/1978 | |
| JP | 61210255 A * | 9/1986 | |
| JP | 2003139223 A | 5/2003 | |

OTHER PUBLICATIONS

European Search Report (May 9, 2012) for corresponding European App. EP 08 87 9295.

* cited by examiner

ENGINE ARRANGEMENT COMPRISING A NOISE SHIELD

BACKGROUND AND SUMMARY

The invention relates to an engine arrangement comprising a noise shield and a vehicle according to the preambles of the independent claims.

It is known in the art to furnish engines of vehicles with shields of noise insulating material. Truck engines compared to passenger car engines emit more noise due to size and power of the engine. To fulfil more and more restrictive requirements with respect to emissions, the injection pressure of the engine is increased thus also increasing noise emission. On the other hand, noise shields provide a thermal insulation which may require additional cooling of the engine.

It is desirable to provide an engine arrangement which provides improved noise abatement even for engines with a high injection pressure without deteriorating cooling of the engine.

An engine arrangement is proposed for a vehicle, particularly a commercial vehicle, particularly a truck, comprising subsequently arranged and encompassed in a casing an engine block, an engine transmission and a flywheel, wherein a noise shield patch is arranged at a circumferential section of the casing overlaying not more than 75% of the circumferential section and wherein the patch is arranged predominantly beneath the casing. It is to be understood that the casing can comprise more than one housing, for instance a housing of the engine block and a flywheel housing and/or a housing of the engine transmission. The patch may even extend backwards and cover at least a portion of a clutch housing attached to the engine.

By arranging the patch predominantly underneath the casing, thermal requirements for the engine block are not deteriorated. Despite the relatively small area of the noise shield patch, the noise abatement is on a high level. The noise abating effect of the patch can be increased further if the patch can be extended to a clutch housing arranged behind the engine.

Favourably, the noise shield patch can cover an area with a high level of noise emission of the engine arrangement. Vibrations are transmitted from the piston movements in the cylinders to the crankshaft and the engine transmission. The gears in the engine transmission are excited by the vibrations and emit noise. Surprisingly it is found that it is not necessary to cover all the engine arrangement or the complete circumferential section of the engine transmission. In contradistinction to this it is sufficient to cover only a portion of the circumferential section, particularly the section beneath the engine transmission. As only a portion of the engine arrangement is covered by the patch, the cooling of the engine block is hardly affected.

According to a favourable embodiment of the invention, the patch can cover the circumferential section not more than up to an average level of a crankshaft in the engine block. It is even sufficient to cover only a bottom portion to achieve improved noise abatement of the engine.

According to a favourable embodiment of the invention, the patch can be arranged predominantly underneath a flywheel housing. Favourably, the patch covers a noise source which emits a high level of noise. This embodiment is advantageous when the engine transmission is integrated in the flywheel housing.

According to a favourable embodiment of the invention, the patch can cover a portion of the circumferential section closest to the engine transmission. The patch can be arranged below the engine transmission and/or at the side of the engine transmission. Favourably, the portion of the circumferential section closest to the engine transmission can be arranged at the side of the engine arrangement. The engine transmission is the strongest emitting noise sources in the arrangement. Thus, noise emission is effectively diminished.

According to a favourable embodiment of the invention, the patch can comprise a noise absorbing material at an inside facing the casing and a protective shield at the outside. A preferred thickness of the patch can be between 6 mm and 30 mm, depending on the most important noise frequencies. Generally, the thicker the patch is, the better is the improvement in noise abatement. However, space is very restricted around the engine arrangement. The patch can favourably be made of two sections, a noise absorber at an inner side facing the noise source and an outer shell which protects and carries the inner noise absorber. For instance, the patch can be made of a fibrous material impregnated with a resin and compacted in the outer side, e.g. by melting the resin in the fibrous material thus forming a virtually air tight shell with a sound absorbent inner side. Of course, the patch can also be laminated and consist of or comprise a shell with a noise absorber laminated to it. Preferably, an effective sound absorption material is used on the inside of the patch i.e. that portion of the patch heading the noise source.

According to a favourable embodiment of the invention, a distance between at least a portion of the patch and the casing is equal to or less than 30 mm. The portion can be a portion on the inside of the patch and/or on a perimeter of the patch. Preferably, the distance can be equal to or less than 10 mm. Expediently the patch can be arranged as close to the casing as possible or as appropriate. For instance, at least 50%, preferably 80% of the area of the patch and/or the perimeter of the patch follow closely the contours of the circumferential section covered by the patch. More particularly, the patch covers steps on the outer surface of the casing, for instance between the flywheel housing and the engine block, particularly between an oil pan beneath the engine transmission and the flywheel housing, thus providing a better noise abatement. Favourably, if the perimeter follows the casing surface closely, it is not necessary that the inner surface follows the contours of the casing so closely in the same way. The close-fitting perimeter still provides superior noise abatement, as the noise will be trapped inside the patch perimeter. Such a patch can be used for different kinds of engines, i.e. one noise patch shield can be used for different types of engines. The air gap between the perimeter and/or the patch inside can vary, but favourable can be kept as small as possible along the perimeter.

According to a favourable embodiment of the invention, the patch covers a portion of the circumferential section closest to the engine transmission. The engine transmission is the predominant noise source. The noise emitted by the engine transmission can be efficiently reduced.

According to a further favourable embodiment of the invention, the engine transmission can be provided to be arranged at a rear of the engine block in a mounted state in the vehicle.

According to a further favourable embodiment of the invention, the patch can be attached to the circumferential section with flexible connectors. Thus, vibrations are not likely to be introduced into the noise shield.

According to a further favourable embodiment of the invention, the patch can cover at least a step between an oil pan and the flywheel housing. Additionally or alternatively, the patch can cover at least a step between an oil pan beneath the engine transmission and the flywheel housing. Thus, noise emitting parts can be covered by the noise shield patch at locations which are vulnerable for emission of noise.

According to a further favourable embodiment of the invention, the engine block can be supplied with a fuel injection pressure of at least 75 MPa, favourably 100 MPa. High injection pressures induce highly dynamic forces into the engine transmission thus increasing the noise problem related to the engine transmission. Favourably, the patch can abate noise for advanced engines with high injection pressures for advanced emission standards such as Euro 5 and Euro 6

According to a further aspect of the invention, a vehicle is proposed comprising an engine arrangement according to anyone of the features described above.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION

Figure 1:
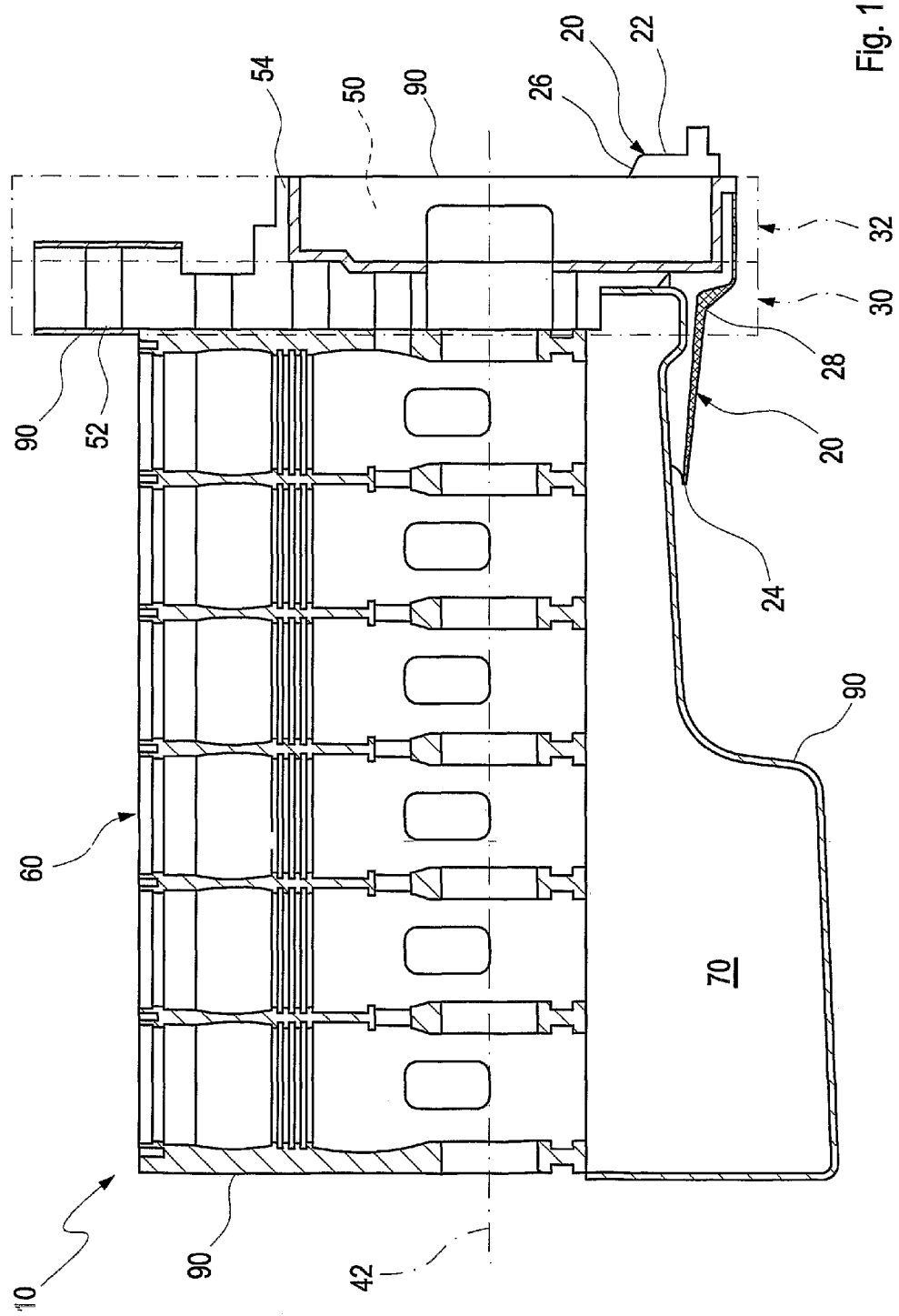
FIG. 1 a cut through an engine arrangement according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
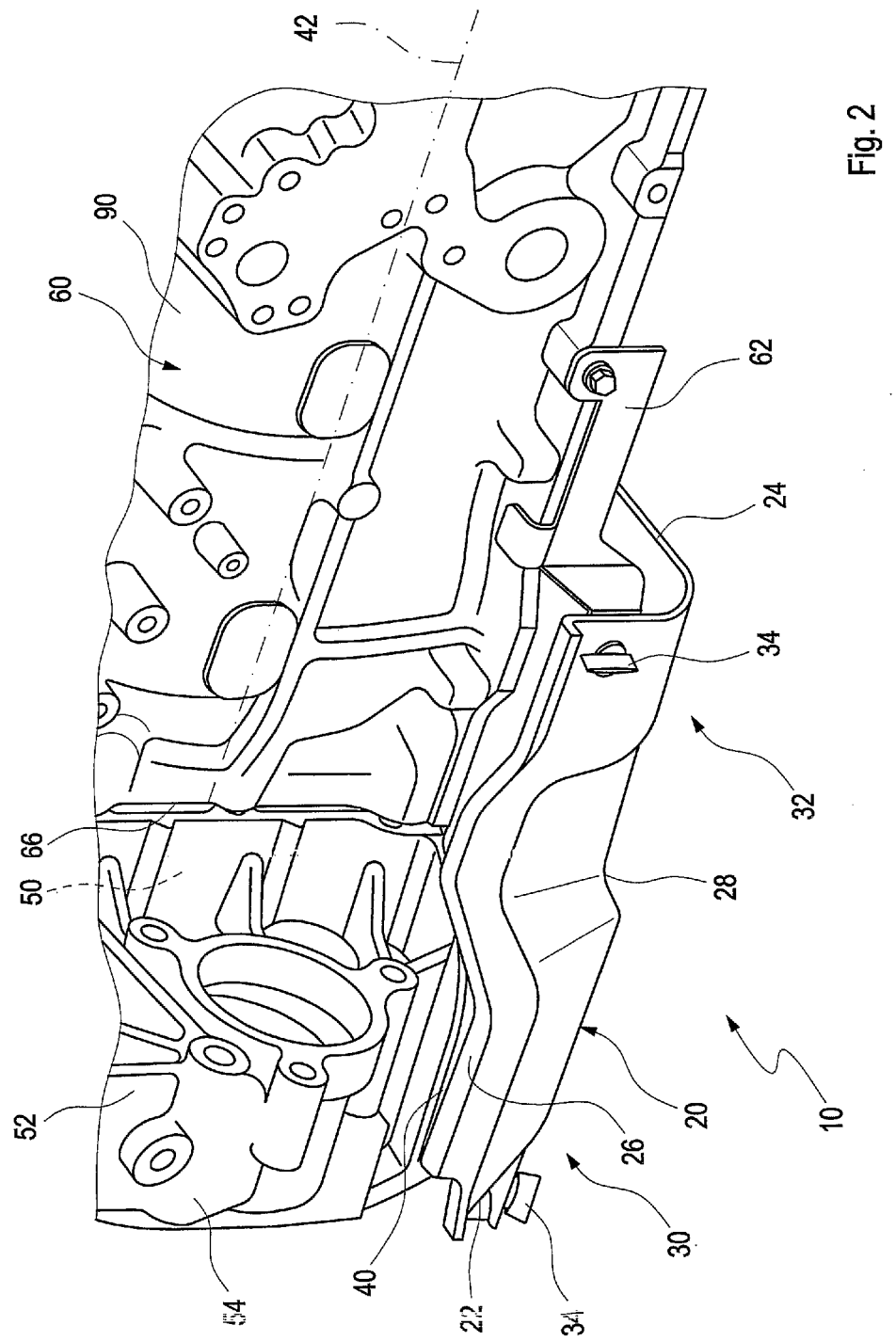
FIG. 2 a perspective partly exploded view on one side of the embodiment of the engine arrangement of FIG. 1.

FIG. 1 and FIG. 2 illustrate an engine arrangement 10 for a vehicle 100 (FIG. 7), wherein FIG. 1 displays a cut along a longitudinal axis of the engine arrangement 10 and FIG. 2 depicts schematically a perspective view on one side of the engine arrangement 10 of FIG. 1.

The engine arrangement 10 comprise subsequently arranged an engine block 60, an engine transmission 52 and a flywheel 50 (the flywheel position is indicated by an arrow). The engine block 60, the engine transmission 52 and the flywheel 50 are encompassed in a casing 90 which generally defines the outer contour of the engine.

The noise shield patch 20 is arranged at circumferential sections 30, 32 of the casing 90 corresponding to the location of the flywheel 50 and/or the engine transmission 52, and is arranged predominantly beneath the casing 90.

The patch 20 is arranged at a circumferential section 30 of the engine transmission 52 predominantly underneath the engine transmission 52. The circumferential section 30 particularly identifies the axial location of the engine transmission 52 in axial direction of the engine arrangement 10.

The circumferential section 32 particularly identifies the axial location of the flywheel 50 in axial direction of the engine arrangement 10.

The engine transmission 52 can be arranged in a separate transmission housing in the casing 90 or, as in this example, in the flywheel housing 54. If the engine transmission 52 is arranged in a transmission housing, the circumferential section 30 preferably may correspond to the transmission housing. If the engine transmission 52 is arranged in another segment of the engine block 60, the circumferential section 30 preferably may correspond to this segment.

It should be noted that the flywheel 50 and the engine transmission 52 are well defined parts in an engine. However, the housings around these parts are though less well defined. The flywheel housing 54 is normally the lowest point of the engine (often 250 mm beneath the crankshaft) because it has to cover the bottom part of the flywheel 50 and is normally cylindrically shaped at least in the bottom region. The integration and dividing lines between these housings within the casing 90 can be designed in many ways. On the other side of the engine transmission 52 the oil pan 70 is arranged and inside this the crank, meaning that the oil pan 70 has to be e.g. 150 mm below the crankshaft centre. This indicates that a patch 20 could be close to the oil pan 70 and the flywheel housing 54 but distant to the engine transmission housing. For instance, the engine transmission housing could end about 80 mm beneath the crankshaft centre.

In this embodiment, the oil pan 70 is arranged beneath the engine transmission 52 and covered by the patch 20. In another embodiment (not shown) the patch can be arranged at the side of the casing 90 covering the engine transmission 52 without covering the oil pan 70 in this circumferential section.

Only some parts are included in the partly exploded view in FIG. 2 like the engine block 60, the flywheel housing 54 and the patch 20 of a noise insulation. The free space between the engine block 60 and the patch 20 is filled up with an oil pan 70 (FIG. 1), not shown in FIG. 2. The free space between the flywheel housing 54 and the engine block 60 is filled up with a steel plate (not shown) in a normal assembly.

The engine arrangement 10, particularly a commercial vehicle, particularly a truck, comprises subsequently arranged an engine block 60, an engine transmission 52 and a flywheel 50. The flywheel 50 and the engine transmission 52 may be integrated in a common flywheel housing 54. In this embodiment, the flywheel housing 54 is arranged at the rear 66 of the engine block 60, pointing to the rear side of the vehicle 100 (FIG. 7) in a mounted state of the engine arrangement 10.

The patch 20 does overlay not more than 75% of the circumferential section 30, particularly, the patch 20 reaches up to the height of a crankshaft arranged inside the engine block 60, indicated by a line 42. The height of the crankshaft can be defined as the geometrical centre axis if the crankshaft.

The patch 20 is attached to the flywheel housing 54 and the engine block 60 by preferably flexible screws 34 which can be attached directly to the engine block 60 and/or the flywheel housing 54 or can be connected to holders 62 attached to the engine block 60 and/or the flywheel housing 54.

The patch 20 has a U-shaped form with a broad basis which covers the bottom of the circumferential section 30 of the flywheel housing 54 comprising the flywheel 52 and the engine transmission 50. The patch 20 extends from the flywheel housing 54 to a circumferential section 32 of the engine block 60.

The patch 20 reproduces the surface structure of the circumferential section 30, 32 which are covered by the patch 20. For instance, a step 28 at an interface between the circumferential section 30 and the circumferential section 32 is covered by the patch 20 thus preventing or at least reducing noise emission from this step 28.

An upper rim, e.g. the perimeter 26 of the patch 20 encompasses a small portion of the engine arrangement 10 above the bottom of the engine arrangement 10. A rear end 22 and a front end 24 of the patch 20 point in longitudinal direction with respect to the engine arrangement 10. The perimeter 26 favourably follows closely the contour of the casing 90.

The patch 20 can follow the surface structure of the circumferential section 30, 32 closely. Preferably, at least a portion of the inner side of the patch 20 directing towards the casing 90 (i.e. the flywheel housing 54 and/or the engine block 60) and/or at least a portion of the perimeter 26 of the patch 20 have a distance 40 of not more than 30 mm from the casing 90, favourably not more than 20 mm, more favourably not more than 10 mm. The closer the distance 40 between the patch 20 and the casing 90 the better is the result in noise abatement.

Figure 3:
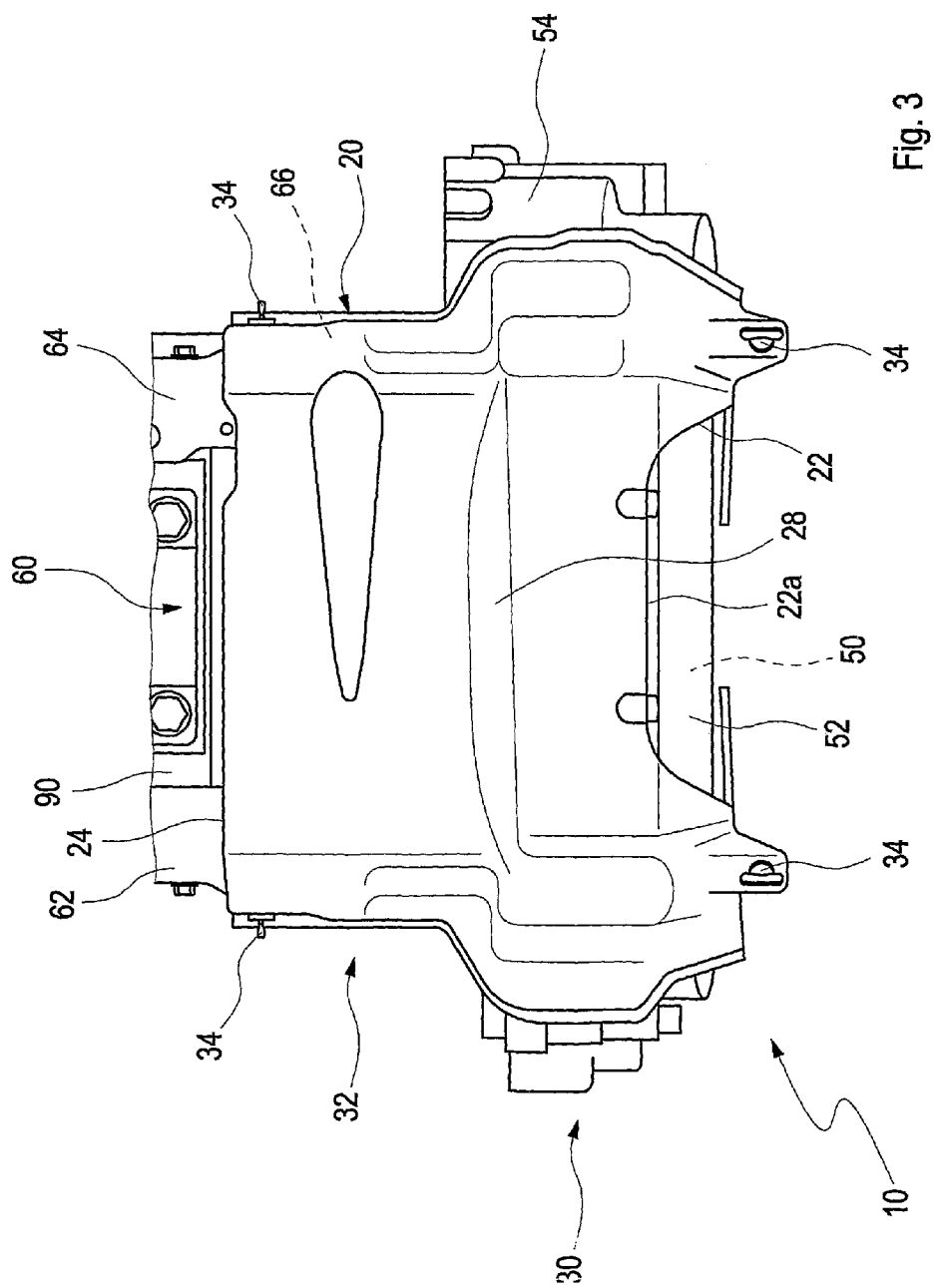
FIG. 3 a bottom view of the embodiment of the engine arrangement of FIG. 1.

FIG. 3 depicts a bottom view of the embodiment of the engine arrangement 60 of FIG. 1. The U-shaped patch 20 extends from the circumferential section 30 beneath the flywheel housing 54 to the circumferential section 32 beneath the engine block 60 at the interface between the flywheel housing 54 and the engine block 60. The rear end 22 of the patch 20 shows a recess 22a at a central portion of the rearmost face of the flywheel housing 54 yielding access to the flywheel housing 54. The recess 22a is provided for practical reasons, e.g. that the ground clearance of the truck should not be decreased.

Figure 4:
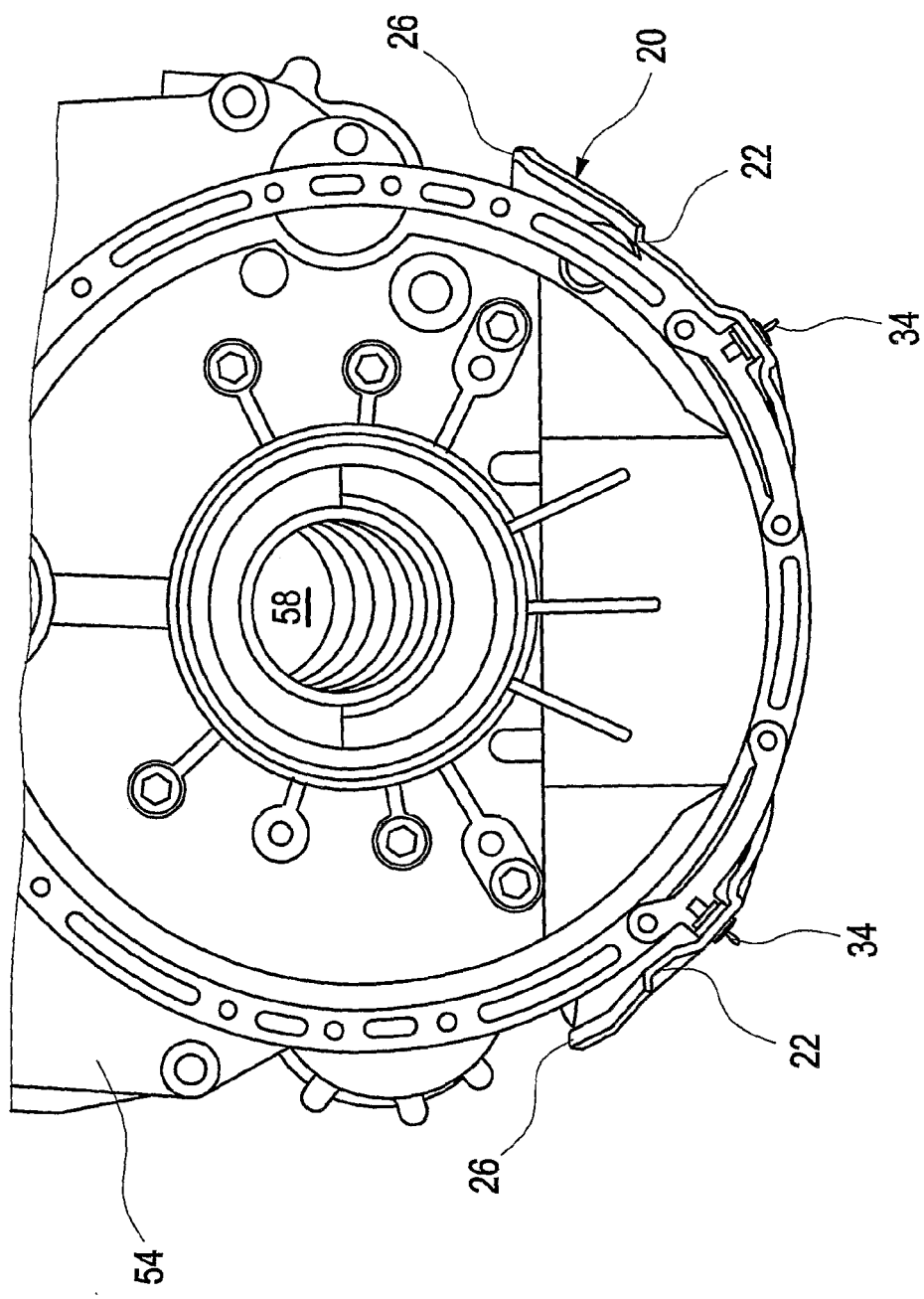
FIG. 4 a rear view of the embodiment of the engine arrangement of FIG. 1.

FIG. 4 shows a rear view of the embodiment of the engine arrangement 10 of FIG. 1 at the flywheel housing side. As can be seen, the patch 20 covers closely the bottom part of the engine arrangement 10 at the flywheel housing 54 and encompasses only a small portion of the circumference of the flywheel housing 54. Opening 58 is provided for crankshaft in the engine block 60 (not shown); bearings of the crankshaft can be seen in the opening 58

Figure 5:
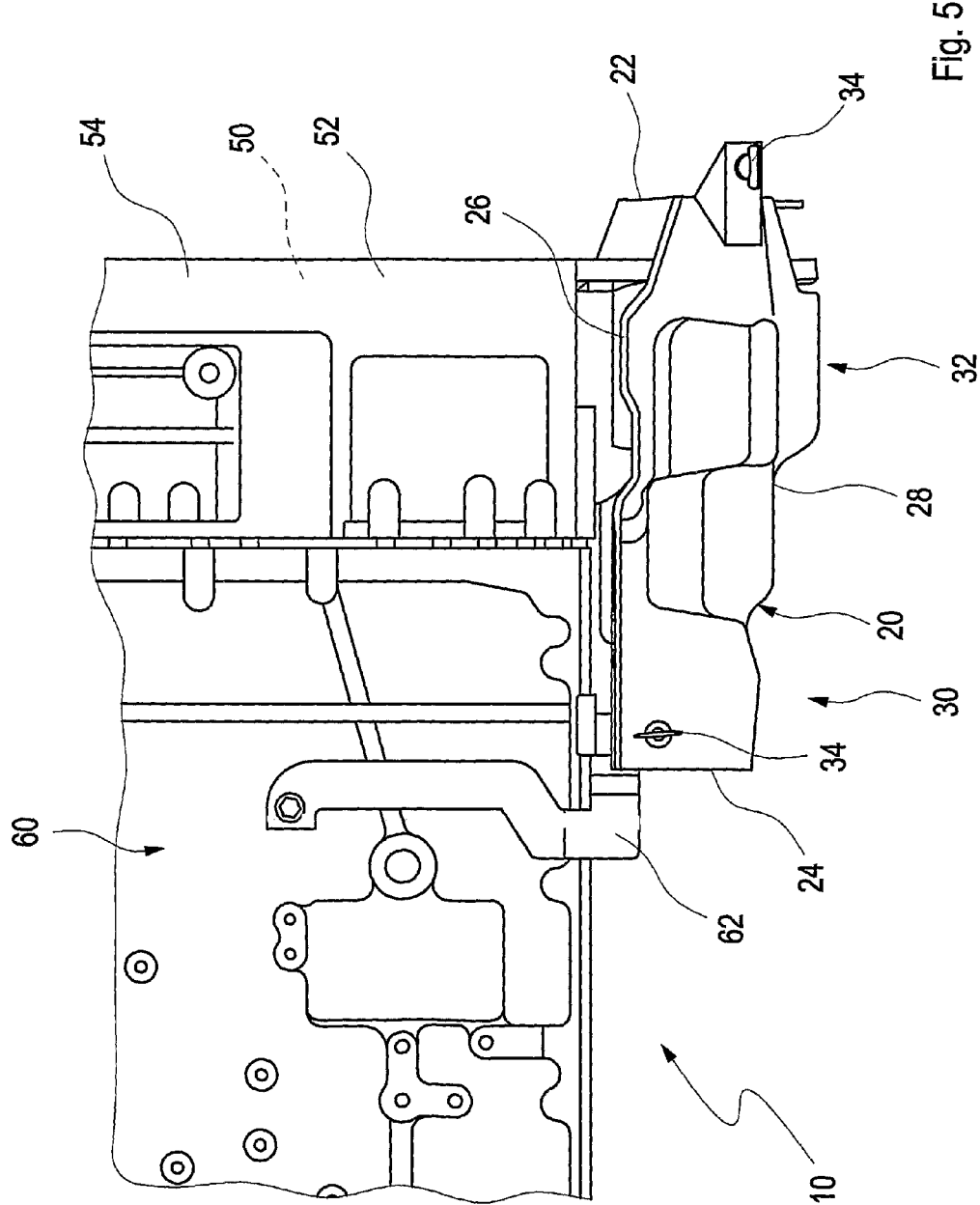
FIG. 5 a side view of the engine arrangement according to FIG. 1.

The side view in FIG. 5 of the engine arrangement 10 according to FIG. 1 illustrates how small a circumferential portion the patch encompasses of the engine arrangement 10. Nevertheless, the noise abatement results in a noise reduction of about 1±0.5 dB(A), preferably measured according to a standard noise measurement according to ISO 362.

Figure 6:
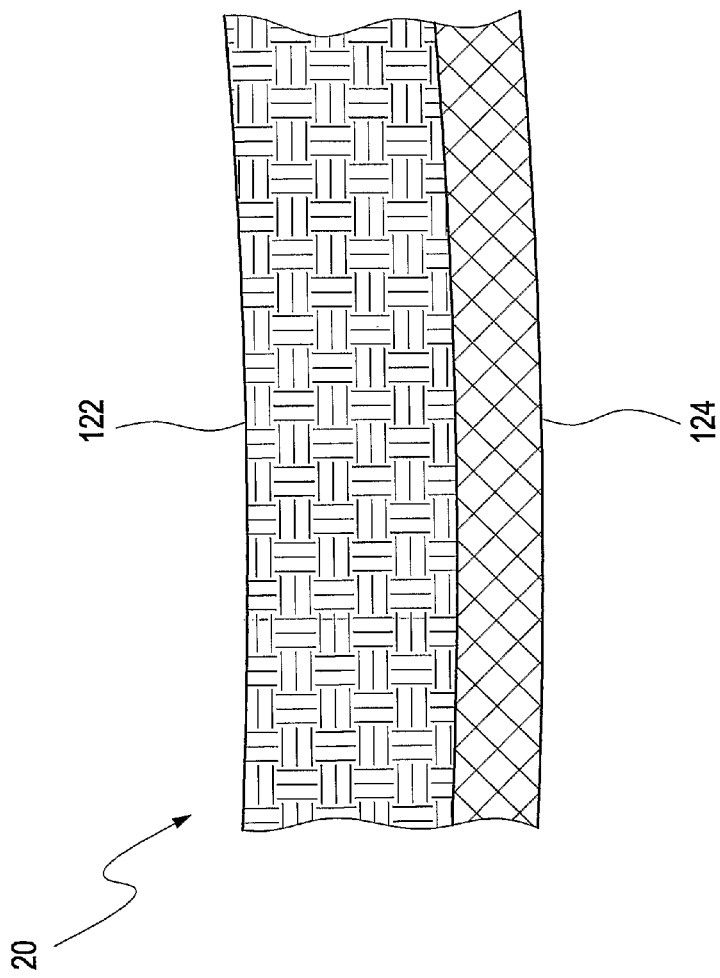
FIG. 6 an embodiment of a noise shield patch consisting of or comprising a noise absorbing inside and a protective carrier.

FIG. 6 shows a schematic sketch of a preferred patch 20. The patch 20 can comprise a noise absorbing material at an inner side 122 facing the casing 90 (FIG. 1) and a protective shield at the outside 124. A preferred thickness of the patch 20 can be between 6 mm and 30 mm, depending on the most important noise frequencies. The patch 20 can favourably be made of two sections, a noise absorber at the inner side 122 facing the noise source and a shell at the outside 124 which protects and carries the inner noise absorber. For instance, the patch can be made of a fibrous material impregnated with a resin and compacted in the outer side, e.g. by melting the resin in the fibrous material thus forming a virtually air tight shell with a sound absorbent inner side. The patch 20 can also be laminated from different components.

Figure 7:
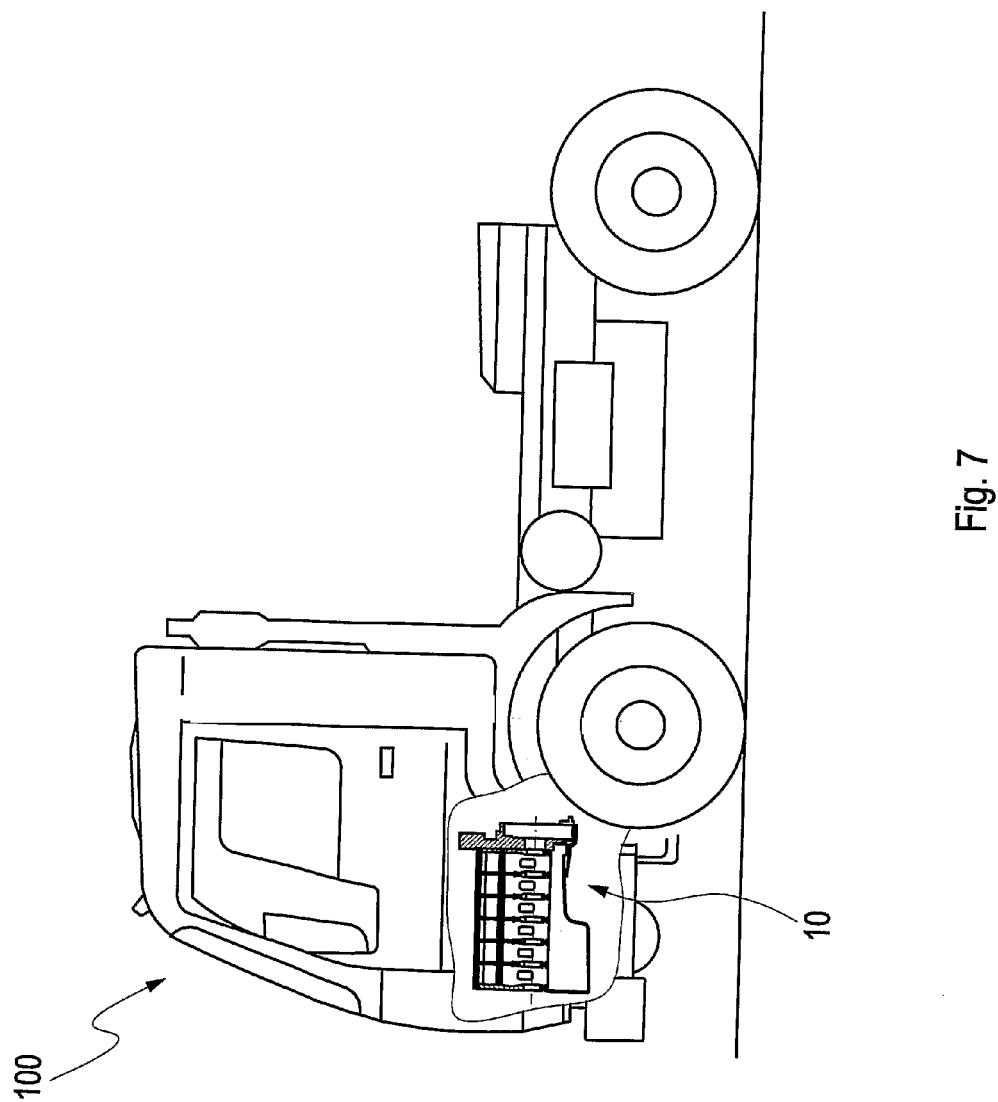
FIG. 7 an embodiment of a vehicle according to the invention.

FIG. 7 shows an embodiment of a vehicle 100 according to the invention. An engine arrangement 10 according to the invention is installed in an engine compartment underneath a cab of the vehicle 10. Preferably, the flywheel 50 and the engine transmission 50 may be integrated in a common flywheel housing 54 (FIG. 1). The flywheel housing 54 is arranged at the rear 66 of the engine block 60, pointing to the rear side of the vehicle 100 in a mounted state of the engine arrangement 10.

The invention claimed is:

1. An engine arrangement for a vehicle, comprising an engine block, an engine transmission and a flywheel arranged in and encompassed by a casing, wherein a noise shield patch is arranged at a circumferential section of the casing corresponding to a location of the flywheel and/or the engine transmission overlaying not more than 75% of the circumferential section and wherein the patch is arranged predominantly beneath the casing, wherein the patch is attached to the circumferential section with flexible connectors, and wherein the patch comprises a noise absorbing material at an inner side facing the casing and a protective shield at the outside.

2. The engine arrangement according to claim 1, wherein a portion of the circumferential section covered by the patch is not exceeding an average level of a crankshaft in the engine block.

3. The engine arrangement according to claim 1, wherein the patch is arranged predominantly underneath a flywheel housing.

4. The engine arrangement according to claim 1, wherein the patch covers a portion of the circumferential section closest to the engine transmission.

5. The engine arrangement according to claim 4, wherein the portion of the circumferential section closest to the engine transmission is arranged at the side of the engine arrangement.

6. The engine arrangement according to claim 1, wherein the distance is equal to or less than 10 mm.

7. The engine arrangement according to claim 1, characterized wherein the engine transmission is provided to be arranged at a rear of the engine block in a mounted state in the vehicle.

8. The engine arrangement according to claim 1, wherein the patch is attached to the circumferential section with flexible connectors.

9. The engine arrangement according to claim 1, wherein the patch covers at least a step between an oil pan and the flywheel housing.

10. The engine arrangement according to claim 1, wherein the patch covers at least a step between an oil pan beneath the engine transmission and the flywheel housing.

11. The engine arrangement according to claim 1, wherein the engine block is supplied with a fuel injection pressure of at least 75 MPa.

12. A vehicle comprising an engine arrangement comprising an engine block, an engine transmission, and a flywheel arranged in and encompassed by a casing, wherein a noise shield patch is arranged at a circumferential section of the casing corresponding to a location of the flywheel and/or the engine transmission overlaying not more than 75% of the circumferential section and wherein the patch is arranged predominantly beneath the casing, wherein the patch is attached to the circumferential section with flexible connectors, and wherein the patch comprises a noise absorbing material at an inner side facing the casing and a protective shield at the outside.

13. The vehicle according to claim 12, wherein the flywheel and the engine transmission are arranged at the rear of the engine block.

* * * * *